Figure 1:
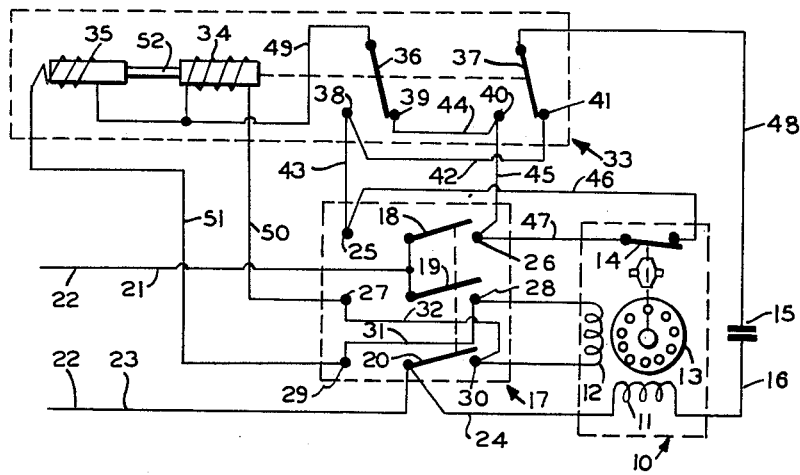

Nov. 14, 1961   R. E. PROUTY   3,009,088

MOTOR REVERSING CONTROL SYSTEM

Filed Aug. 5, 1960

INVENTOR
ROBERT E. PROUTY

BY *Robert D. Sommer*

AGENT

United States Patent Office 3,009,088
Patented Nov. 14, 1961

3,009,088
MOTOR REVERSING CONTROL SYSTEM
Robert E. Prouty, Logansport, Ind., assignor to Essex Wire Corporation, Fort Wayne, Ind., a corporation of Michigan
Filed Aug. 5, 1960, Ser. No. 47,809
5 Claims. (Cl. 318—207)

This invention relates to the control of single-phase A.-C. induction motors of the type having a main running winding and an auxiliary starting winding and, more particularly, to an improved control arrangement for quickly reversing the direction of rotation of such motors.

Single-phase induction motors, such as of the split-phase and capacitor-start types, generally use a starting switch to disconnect the starting winding from the power supply when the motor reaches a predetermined speed. Because the starting winding which determines the direction of rotation is ordinarily disconnected at normal motor speed, it is not possible to reverse such a motor during operation by merely reversing the application of power to the main winding. It has therefore been necessary to employ means for bypassing the starting switch where it was desired to quickly reverse the direction of the motor. Such means, in many instances, have required the use of expensive and complex switches and relays, required alteration of the motor, or were not entirely reliable in operation.

Accordingly, it is the object of this invention to provide a quick reversing control for such motors which employs relatively simple and inexpensive devices, which may be readily adapted to such motors without changing the motor structure and which will be satisfactory in operation.

In the preferred embodiment of the present invention, the reversing control system for a single-phase induction motor comprises a switch operated by magnetic means, including two coils for selective actuation of the switch to either of two positions and a reversing switch. The reversing switch is connected to be operable to simultaneously reverse the phase of the current through the running winding of the motor and selectively energize the coils of the magnetic means. The reversing switch is also connected in circuit with the magnetically operated switch for selective energization of the motor starting winding and the magnetic means through a circuit including the magnetically operated switch. Additional circuit means including the motor starting switch are associated with the reversing switch and the magnetically operated switch so that when the motor speed is below that value at which the starting switch operates, both the starting winding and the magnetic means will be energized. This control system is effective to bypass the motor starting switch when reversal of the motor is desired while the motor is operating at a normal speed, yet returns control of the motor starting winding to the starting switch as the motor is slowed during its reversal.

Figure 2:
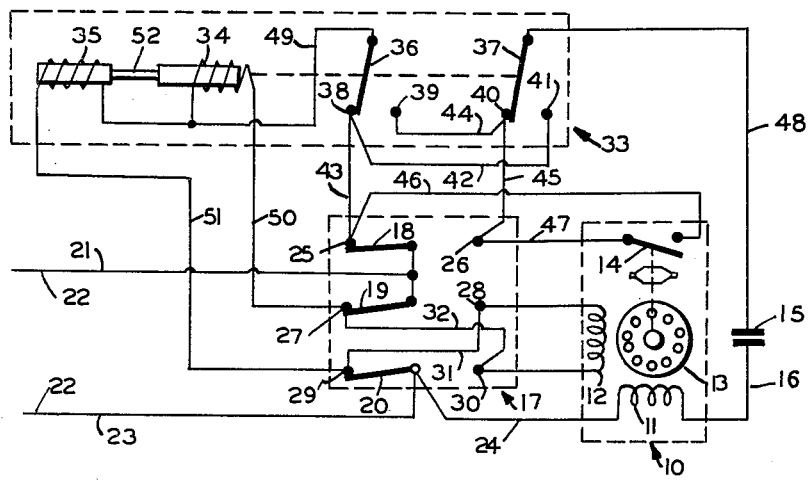

Other features, objects and advantages will be apparent from the following description and the accompanying drawing in which:

FIG. 1 is a schematic wiring diagram of a motor-reversing control system applied to a single-phase A.-C. induction motor; and FIG. 2 is a schematic wiring diagram similar to FIG. 1, but showing the conditions existing during operation of the motor in one direction.

Referring to the drawing, there is shown a capacitor-start, single-phase indiction motor 10 having a starting winding 11 and a running winding 12 associated with a rotor 13 which may be of the squirrel cage type. The motor includes a speed-responsive switch 14 which opens when the motor exceeds a predetermined speed. Switch 14 is illustrated as being of the centrifugal type, but may be of the relay-operated type having a coil connected either in parallel with the starting winding 11 or in series with the running winding 12. A capacitor 15 is connected in series with the starting winding 11 by conductor 16, but would not be required, of course, for a conventional split-phase motor.

The means for controlling operation of the motor 10 comprises a double-throw, triple-pole reversing switch 17 which may be manually operated. Switch 17 has three movable contact members 18, 19 and 20. One line 21 of the power supply 22 is connected to contact members 18 and 19, and the other line 23 is connected to contact member 20 and also to one end of the starting winding 11 through conductor 24. Cooperating with movable contact members 18, 19 and 20 are respective pairs of stationary contacts 25 and 26, 27 and 28, and 29 and 30. The running winding 12 is connected to contacts 28 and 30 and also through conductors 31 and 32, respectively, to contacts 29 and 27. With these connections, movable contact members 19 and 20 are effective to energize running winding 12 in opposite directions when switch 17 is moved from one closed position to another.

The control system for motor 10 also includes a relay 33 which functions to bypass the speed-responsive switch 14 during the interval between the time when switch 17 is shifted to start reversal of the motor and the time when the motor speed decreases to the value at which the speed-responsive switch 14 recloses. The relay 33 is provided with two coils 34 and 35 and with a double-throw, double-pole switch which includes movable contact members 36 and 37 that coact with respective pairs of stationary contacts 38 and 39, and 40 and 41. Contact 38 is connected through conductor 42 to contact 41 and is connected through conductor 43 to contact 25 of switch 17. The other contacts 39 and 40 are connected to each other by conductor 44 and also to contact 26 of switch 17 through conductor 45. The speed-responsive switch 14 is also connected to contacts 25 and 26, respectively, through conductors 46 and 47. Contact member 37 is connected to the capacitor 15 through conductor 48 and the other contact member 36 is connected through conductor 49 to one side of coil 34 which is also connected to one side of coil 35. The other side of coil 34 is connected through conductor 50 to contact 27 of switch 17 while the other side of coil 35 is connected through conductor 51 to contact 29 of switch 17. The contact members 36 and 37 are operated by an armature member 52 which is moved in response to energization of one or the other of the coils 34 and 35. When coil 34 is energized, the armature member 52 is shifted to the position shown in FIG. 1. Conversely, when coil 35 is energized, the armature member 52 is shifted in the opposite direction to the position shown in FIG. 2. Relay 33 is of the type in which the movable contact members 36 and 37 are held in given positions after either one of the coils 34 and 35 is deenergized and until the other one of the coils is energized. Preferably, the contact members 36 and 37 operate with a snap action.

In accordance with the invention, the motor-reversing control system functions as follows:

Referring to FIG. 1 and assuming that the motor 10 is at standstill and that switch 17 is in a neutral position wherein none of its stationary contacts is engaged by a movable contact member. Neither of the relay coils 34 and 35 is energized and armature member 52 is in its right position, coil 34 being the last coil energized. Inasmuch as the motor is not rotating, the speed-responsive switch 14 will be closed.

If the movable contact members 18, 19 and 20 of switch 17 be thrown to a full right position, current flows from line 21 through contact member 18 and contact 26 of switch 17, conductors 45 and 44, contact 39 and contact member 36 of relay 33, conductor 49, relay coil 34, conductors 50 and 31, contact 30 and contact member 20 of switch 17, line 23 and back to the power supply 22. The relay armature member 52 remains in its right position and current flows from the power supply 22 through line 23, conductor 24, starting winding 11, conductor 16, capacitor 15, conductor 48, contact member 37 and contact 41 of relay 33, conductors 42, 43 and 46, speed-responsive switch 14, conductor 47, contact 26 and contact member 18 of switch 17, and line 21. At the same time, current flows from the power supply 22 through line 21, contact member 19 and contact 28 of switch 17, running winding 12, contact 30, contact member 20 and line 23. The rotor 13 then begins to rotate and when it attains a predetermined speed, speed-responsive switch 14 will open to break the circuit from the power supply 22 to the starting winding 11.

When it is desired to reverse the direction of the rotation of rotor 13, switch 17 is thrown to its full left position. In this position, the circuit to relay coil 34 is interrupted, but since coil 35 is not energized, the contact members 36 and 37 will remain in their right positions. In this same position of the switch 17, a circuit to the starting winding 11 is completed and the polarity of the voltage applied to the running winding 12 with respect to the starting winding 11 is reversed. The circuit to the starting winding is from the power supply 22 through line 21, contact member 18 and contact 25 of switch 17, conductors 43 and 42, contact 41 and contact member 37 of relay 33, conductor 48, capacitor 15, conductor 16, starting winding 11, conductor 24 and line 23. The circuit for the running winding 12 is from the power supply 22 through line 21, contact member 19 and contact 27 of switch 17, conductor 32, winding 12, conductor 31, contact 29 and contact member 20 of switch 17 and back through line 23.

With the motor 10 thus connected it is apparent a reverse torque is applied to the rotor 11 which first causes the motor to quickly slow down and then rotate in the opposite direction to that which it had been previously rotating. As rotor 13 slows, speed-responsive switch 14 recloses to energize relay coil 35 through a circuit which includes line 21, contact member 18 and contact 25 of switch 17, conductor 46, speed-responsive switch 14, conductors 47, 45 and 44, contact 39 and contact member 36 of relay 33, conductor 49, relay coil 35, conductor 51, contact 29 and contact member 20 of switch 17 and line 23. Armature member 52 then moves to the left to shift contact members 36 and 37 to their left positions shown in FIG. 2. In this position of relay 33, the relay coil 35 is reconnected in a new circuit independent of the speed-responsive switch, while the speed-responsive switch is again connected in circuit with the starting winding 11 to disconnect the latter when the rotor attains a predetermined speed in the reversed direction of rotation. The current flow to relay coil 35 is now from the power supply 22 through line 21, contact member 18 and contact 25 of switch 17, conductor 43, contact 38 and contact member 36 of relay 33, conductor 49, coil 35, conductor 51, contact 29 and contact member 20 of switch 17 and line 23. The circuit for the starting winding 11 now consists of line 21, contact member 18 and contact 25 of switch 17, conductor 46, speed-responsive switch 14, conductors 47 and 45, contact 40 and contact member 37 of relay 33, conductor 48, capacitor 15, conductor 16, starting winding 11, conductor 24 and line 23. As soon as the motor attains a predetermined speed, the speed-responsive switch 14 opens and the motor continues to be operated in the reversed direction by running winding 12.

It is apparent from the above description that if the switch 17 be returned to its right position while the rotor is turning in its reversed direction, the starting winding 11 will again be energized and the polarity of the voltage applied to the running winding 12 with respect to that of starting winding 11 will be reversed to cause instant reversal of the direction of rotation of the rotor 13. The manner in which the control system functions to accomplish such reversal of the motor is substantially the same as when switch 17 was shifted from its right position to its left position and will not be further described.

It is also to be noted that the motor 10 may be started in either direction from standstill with the relay 33 in either of its positions and that the direction of rotation of the rotor is determined solely by the position to which switch 17 is thrown. Although switch 17 has been described as having an intermediate position in which both motor windings and both relay coils are deenergized, it is obvious such an intermediate position is not necessary and, if desired, a separate switch could be employed to disconnect the motor windings and the relay coils from the power supply.

While a preferred embodiment of the invention has been described, it is to be understood that the invention is not limited to the precise control system described, and that changes may be made therein without departing from the scope of the invention which is defined in the appended claims.

What is claimed is:

1. An electrical control system for quickly reversing the direction of rotation of a single-phase, alternating current motor of the type having a running winding and a starting winding adapted to be connected in parallel to an alternating current power source and a starting switch operable to an open position to deenergize the starting winding when the speed of the motor in either direction is above a predetermined value, said control system comprising: electromagnetically operated switching means that remains in the position to which it was last actuated; electromagnetic means including first coil means for actuating said electromagnetically operated switching means to a first position and second coil means for actuating said electromagnetically operated switching means to a second position; said electromagnetically operated switching means including first switch means connected to said electromagnetic means and second switch means connected to said starting winding; means for connecting said running winding and said electromagnetic means to said power supply including a reversing switch means operable to simultaneously reverse the phase of the current through said running winding and to selectively control the energization of said first and second coil means; means for connecting said starting winding to said power supply including additional switch means associated with said reversing switch means and connected with said electromagnetically operated switch means for selectively controlling the energization of said starting winding and said electromagnetic means through said electromagnetically operated switch means; and means including said starting switch and connections for connecting said starting switch to said electromagnetically operated switch means operative when the motor speed is below said predetermined value for simultaneously energizing said electromagnetic means and said starting winding.

2. An electrical control system for quickly reversing the direction of rotation of a single-phase, alternating current motor of the type having a running winding and a starting winding adapted to be connected in parallel to an alternating current power source and a starting switch operable to an open position to deenergize the starting winding when the speed of the motor in either direction is above a predetermined value, said control system comprising: a relay having a double-pole, double-throw switch that remains in the position to which it was last actuated; said relay having coil means including a first operating coil for actuating said relay switch to a first position and a second operating coil for actuating said relay switch to a second position; means for connecting said running winding and said relay coils to said power supply including a reversing switch operable to simultaneously reverse the phase of the current through said running winding and to selectively control the energization of said first and second relay coils; said reversing switch including a single-pole, double-throw switch connected to said power supply; means connecting said relay coils to one of the poles of said relay switch; means connecting said starting winding to the other of the poles of said relay switch; said relay switch being connected to said single-pole, double-throw switch and being operative to selectively connect said coil means and said starting winding to said power source through said single-pole, double-throw switch; and means including said starting switch and connections for connecting said starting winding to said relay switch operative when the motor speed is below said predetermined value for simultaneously energizing said coil means and said starting winding.

3. An electrical control system for quickly reversing the direction of rotation of a single-phase, alternating current motor of the type having a running winding and a starting winding adapted to be connected in parallel to an alternating current power source and a starting switch operable to an open position to deenergize the starting winding when the speed of the motor in either direction is above a predetermined value, said control system comprising: a relay having a double-pole, double-throw switch that remains in the position to which it was last actuated; said relay including a first operating coil for actuating said relay switch to a first position and a second operating coil for actuating said relay switch to a second position; said double-pole, double-throw relay switch having a first pair of commonly connected fixed contacts and a second pair of commonly connected contacts and first and second movable contact members; said first contact member and said second contact member, respectively, being connected to said first pair of contacts and second pair of contacts in the first position of said relay switch; said first contact member and said second contact member, respectively, being connected to said second pair of contacts and said first pair of contacts in the second position of said relay switch; a triple-pole, double-throw reversing switch having two poles connected in circuit with said running winding to reverse the phase of the current through said running winding; one side of said first relay coil being connected to a first one of said two poles and one side of said second relay coil being connected to a second one of said two poles to reverse the connection of said relay coils to said power supply; the third pole of said reversing switch having a movable contact member connected to one side of said power supply and a pair of associated fixed contact; conductors connecting the junction of the other sides of said relay coils through one contact member and one pair of contacts of said relay switch to one of said fixed contacts of said third pole; conductors connecting one side of said starting winding through the other contact member and the other pair of contacts of said relay switch to the other of said fixed contacts of said third pole; means connecting the other side of said starting winding to the other side of said power supply; and conductors connecting said starting switch between said fixed contacts of said third pole of the reversing switch.

4. An electrical control system in accordance with claim 3 including a capacitor in series with said starting winding.

5. An electrical control system in accordance with claim 3, wherein said triple-pole, double-throw reversing switch has an "off" position intermediate its two switching positions, in which position the movable contacts of said reversing switch are disengaged from their associated fixed contacts.

No references cited.